United States Patent
Suzuki et al.

(10) Patent No.: US 10,302,009 B2
(45) Date of Patent: May 28, 2019

(54) CONTROL DEVICE, INTERNAL COMBUSTION ENGINE SYSTEM, AND METHOD

(71) Applicant: HONDA MOTOR CO., LTD., Tokyo (JP)

(72) Inventors: Masaki Suzuki, Wako (JP); Masaaki Nagashima, Wako (JP); Masaki Ueno, Wako (JP); Takashi Otobe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 15/352,484

(22) Filed: Nov. 15, 2016

(65) Prior Publication Data

US 2017/0159552 A1 Jun. 8, 2017

(30) Foreign Application Priority Data

Dec. 7, 2015 (JP) .................. 2015-238668

(51) Int. Cl.
*F02B 37/10* (2006.01)
*F02B 37/14* (2006.01)
(Continued)

(52) U.S. Cl.
CPC ............ *F02B 37/14* (2013.01); *F02B 25/145* (2013.01); *F02B 37/10* (2013.01); *F02B 37/18* (2013.01);
(Continued)

(58) Field of Classification Search
CPC ...... F02D 37/02; F02D 41/18; F02D 41/0007; F02D 37/10; F02D 41/10; F02D 13/0261;
(Continued)

(56) References Cited

U.S. PATENT DOCUMENTS 5,819,693 A * 10/1998 Curtil ..................... F02B 29/08
                                                                           123/65 E
9,416,722 B2 * 8/2016 Nakasaka ............ F02D 11/105
(Continued)

FOREIGN PATENT DOCUMENTS

JP       2006-017053       1/2006
JP       2007-023837       2/2007
(Continued)

OTHER PUBLICATIONS

Japanese Office Action for corresponding JP Application No. 2015-238668, dated Oct. 3, 2017 (w/ English machine translation).

*Primary Examiner* — J. Todd Newton

(74) *Attorney, Agent, or Firm* — Mori & Ward, LLP

(57) ABSTRACT

A control device for an internal combustion engine includes circuitry. The circuitry is configured to determine whether a running state of the internal combustion engine is in an auxiliary driving state in which an electric motor drives a compressor. The circuitry is configured to increase an opening degree of a waste gate valve when the running state is determined to be in the auxiliary driving state. The circuitry is configured to control a valve actuation phase variable mechanism to increase an overlap period in which a valve opening period of an intake valve and a valve opening period of an exhaust valve are overlapped with each other when the running state is determined to be in the auxiliary driving state.

14 Claims, 6 Drawing Sheets

(51) Int. Cl.
*F02B 37/18* (2006.01)
*F02D 13/02* (2006.01)
*F02B 25/14* (2006.01)
*F02D 37/02* (2006.01)
*F02D 41/10* (2006.01)
*F02D 41/18* (2006.01)
*F02D 41/00* (2006.01)
*F02D 41/38* (2006.01)

(52) U.S. Cl.
CPC ......... *F02D 13/0261* (2013.01); *F02D 37/02* (2013.01); *F02D 41/0007* (2013.01); *F02D 41/10* (2013.01); *F02D 41/18* (2013.01); *F02D 2041/001* (2013.01); *F02D 2041/389* (2013.01); *F02D 2200/0406* (2013.01); *Y02T 10/144* (2013.01); *Y02T 10/18* (2013.01)

(58) Field of Classification Search
CPC ....... F02D 2200/0406; F02D 2041/389; F02D 2041/001; F02B 37/18; F02B 37/11; F02B 37/10; Y02T 10/18; Y02T 10/144
USPC .......................................................... 60/608
See application file for complete search history.

(56) References Cited

U.S. PATENT DOCUMENTS

| | | | |
|---|---|---|---|
| 2006/0196182 A1* | 9/2006 | Kimoto | F02B 33/44 60/605.1 |
| 2007/0033938 A1* | 2/2007 | Ueno | F02B 37/004 60/612 |
| 2009/0050119 A1* | 2/2009 | Inoue | F02D 41/045 123/564 |
| 2009/0107142 A1* | 4/2009 | Russell | F02B 33/40 60/608 |
| 2010/0131174 A1* | 5/2010 | Wiggins | F02D 13/02 701/103 |
| 2012/0055153 A1* | 3/2012 | Murata | F01K 23/065 60/602 |
| 2012/0137676 A1* | 6/2012 | Murata | F01N 5/02 60/602 |
| 2013/0213351 A1* | 8/2013 | Kitsukawa | F02B 37/10 123/333 |
| 2013/0216408 A1* | 8/2013 | Kitsukawa | F02B 37/10 417/410.1 |
| 2017/0159552 A1* | 6/2017 | Suzuki | F02B 37/11 |
| 2017/0184014 A1* | 6/2017 | Ueno | F02B 39/10 |
| 2018/0010534 A1* | 1/2018 | Takeuchi | F02D 11/105 |
| 2018/0030884 A1* | 2/2018 | Kurotani | F02D 13/0219 |

FOREIGN PATENT DOCUMENTS

| | | |
|---|---|---|
| JP | 2007-262968 | 10/2007 |
| JP | 2008-019835 | 1/2008 |
| JP | 2012-092794 | 5/2012 |
| JP | 2013-127222 | 6/2013 |

* cited by examiner

CONTROL DEVICE, INTERNAL COMBUSTION ENGINE SYSTEM, AND METHOD

CROSS-REFERENCE TO RELATED APPLICATIONS

The present application claims priority under 35 U.S.C. § 119 to Japanese Patent Application No. 2015-238668, filed Dec. 7, 2015, entitled "Control Device for Internal Combustion Engine." The contents of this application are incorporated herein by reference in their entirety.

BACKGROUND

1. Field

The present disclosure relates to a control device, an internal combustion engine system, and a method.

2. Description of the Related Art

Japanese Unexamined Patent Application Publication No. 2007-23837 discloses a control device for internal combustion engine which includes a valve actuation variable mechanism and a supercharger with electric motor. When an electronic motor is actuated to perform supercharging, differential pressure between intake pressure and exhaust pressure (=intake pressure−exhaust pressure) is increased. Therefore, the amounts of fuel and intake air which flow into a combustion chamber and are directly exhausted to an exhaust passage without contributing to combustion (passing-through amount) tend to increase. In order to reduce this passing-through amount, the above-mentioned control device performs control for shortening an overlap period, in which a valve opening period of an intake valve and a valve opening period of an exhaust valve are overlapped with each other, in actuation time of an electric motor (when driving auxiliary of a supercharger is performed) so as to be shorter than that in non-actuation time of the electric motor. Accordingly, excessive increase of the passing-through amount is prevented.

SUMMARY

According to a first aspect of the present invention, a control device for an internal combustion engine in which fuel is directly injected into a combustion chamber, the control device includes a supercharger which includes a turbine, the turbine being provided on an exhaust passage of the engine, a compressor, the compressor being rotationally driven by the turbine and pressurizing intake air of the engine, and an electric motor, the electric motor being provided to be able to drive the compressor, a valve actuation phase variable mechanism which is capable of changing an actuation phase of at least one of an intake valve and an exhaust valve of the engine and a waste gate valve which is provided on a bypass passage bypassing the turbine. When driving auxiliary by the electric motor is performed with respect to the compressor, opening of the waste gate valve is increased and an overlap period in which a valve opening period of the intake valve and a valve opening period of the exhaust valve are overlapped with each other is increased.

According to a second aspect of the present invention, a control device for an internal combustion engine including a combustion chamber into which fuel is directly injected, a supercharger including a turbine provided in an exhaust passage of the internal combustion engine, a waste gate valve provided in a bypass passage bypassing the turbine, a compressor rotationally driven by the turbine and an electric motor to pressurize intake air, and a valve actuation phase variable mechanism configured to change an actuation phase of at least one of an intake valve and an exhaust valve of the internal combustion engine, the control device includes circuitry. The circuitry is configured to determine whether a running state of the internal combustion engine is in an auxiliary driving state in which the electric motor drives the compressor. The circuitry is configured to increase an opening degree of the waste gate valve when the running state is determined to be in the auxiliary driving state. The circuitry is configured to control the valve actuation phase variable mechanism to increase an overlap period in which a valve opening period of the intake valve and a valve opening period of the exhaust valve are overlapped with each other when the running state is determined to be in the auxiliary driving state.

According to a third aspect of the present invention, an internal combustion engine system includes an internal combustion engine and circuitry. The internal combustion engine includes a combustion chamber, a supercharger, a valve actuation phase variable mechanism, and a waste gate valve. Fuel is directly to be injected into the combustion chamber. The supercharger includes a turbine, a compressor, and an electric motor. The turbine is provided on an exhaust passage of the internal combustion engine. The compressor is rotationally driven by the turbine and to pressurize intake air of the internal combustion engine. The electric motor to drive the compressor. The valve actuation phase variable mechanism changes an actuation phase of at least one of an intake valve and an exhaust valve of the internal combustion engine. The waste gate valve is provided on a bypass passage bypassing the turbine. The circuitry configured to determine whether a running state of the internal combustion engine is in an auxiliary driving state in which the electric motor drives the compressor. The circuitry configured to increase an opening degree of the waste gate valve when the running state is determined to be in the auxiliary driving state. The circuitry configured to control the valve actuation phase variable mechanism to increase an overlap period in which a valve opening period of the intake valve and a valve opening period of the exhaust valve are overlapped with each other when the running state is determined to be in the auxiliary driving state.

According to a fourth aspect of the present invention, a method for controlling an internal combustion engine including a combustion chamber into which fuel is directly injected, a supercharger including a turbine provided in an exhaust passage of the internal combustion engine, a waste gate valve provided in a bypass passage bypassing the turbine, a compressor rotationally driven by the turbine and an electric motor to pressurize intake air, and a valve actuation phase variable mechanism configured to change an actuation phase of at least one of an intake valve and an exhaust valve of the internal combustion engine, the method includes determining whether a running state of the internal combustion engine is in an auxiliary driving state in which the electric motor drives the compressor. The method includes increasing an opening degree of the waste gate valve when the running state is determined to be in the auxiliary driving state. The method includes controlling the valve actuation phase variable mechanism to increase an overlap period in which a valve opening period of the intake valve and a valve opening period of the exhaust valve are overlapped with each other when the running state is determined to be in the auxiliary driving state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
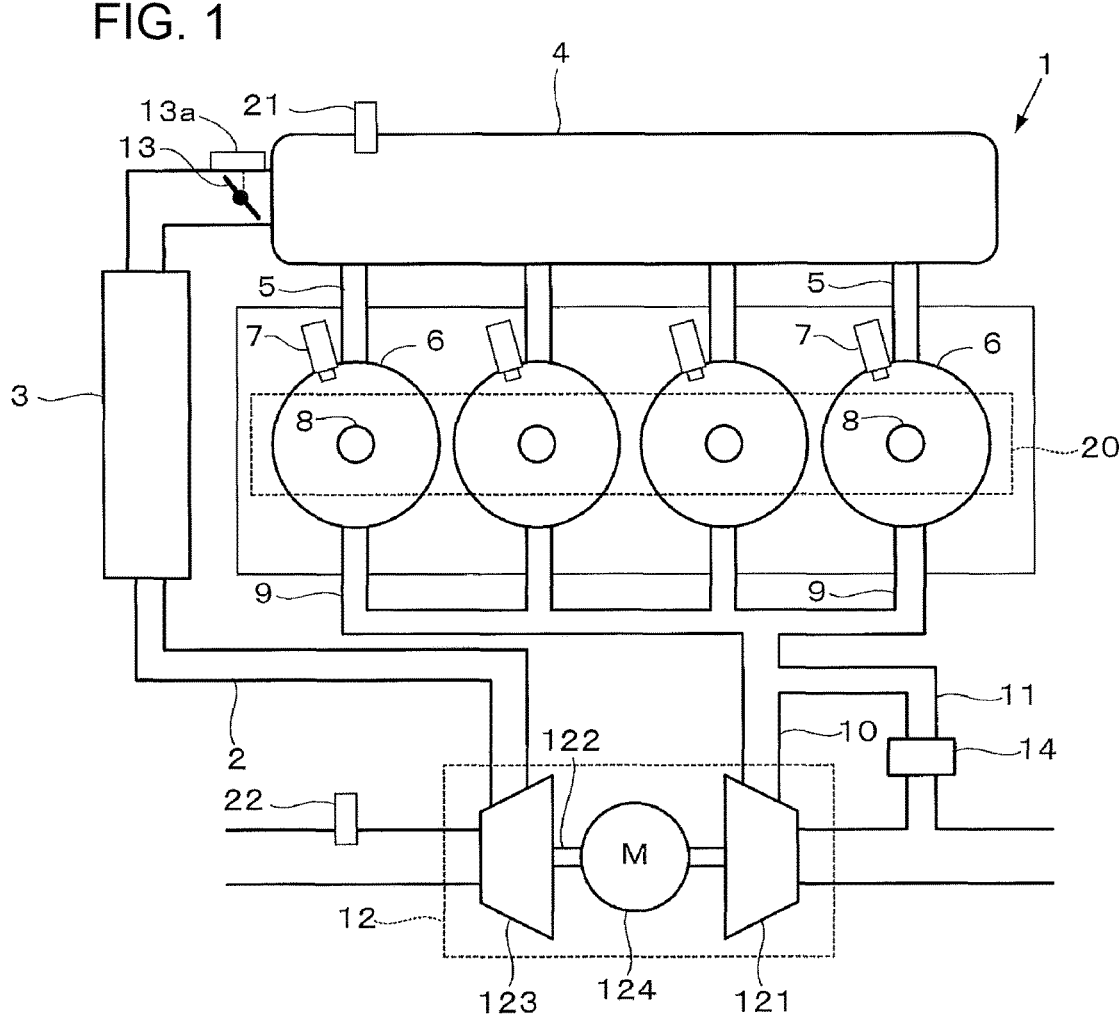
FIG. 1 schematically illustrates the configuration of an internal combustion engine according to an embodiment of the present disclosure.

The embodiments will now be described with reference to the accompanying drawings, wherein like reference numerals designate corresponding or identical elements throughout the various drawings.

An embodiment of the present disclosure will be described with reference to the accompanying drawings.

FIG. 1 schematically illustrates the configuration of an internal combustion engine according to one embodiment of the present disclosure. An internal combustion engine (referred to below as an "engine") 1 is a direct injection engine which includes four cylinders 6 and directly injects fuel into combustion chambers of the cylinders 6. To each of the cylinders 6, a fuel injection valve 7, an ignition plug 8, and an intake valve and an exhaust valve (which are not illustrated) are provided.

The engine 1 includes an intake passage 2, an exhaust passage 10, a turbocharger (supercharger) 12, and a valve actuation phase variable mechanism 20. The intake passage 2 is connected to a surge tank 4 and the surge tank 4 is connected to the combustion chamber of each of the cylinders 6 via an intake manifold 5. To the intake passage 2, an intercooler 3 for cooling down compressed air and a throttle valve 13 are provided. The throttle valve 13 is configured to be able to be driven by a throttle actuator 13a. An intake pressure sensor 21 which detects intake pressure PB is provided to the surge tank 4 and an intake airflow rate sensor 22 which detects intake airflow rate GAIR is provided to the intake passage 2.

The turbocharger 12 includes a turbine 121 which is provided to the exhaust passage 10 and is rotationally driven by the kinetic energy of exhaust air, a compressor 123 which is coupled to the turbine 121 via a shaft 122, and a motor (electric motor) 124 which is provided to be able to rotationally drive the shaft 122. The compressor 123 is provided to the intake passage 2 and pressurizes (compresses) air taken into the engine 1. By driving the motor 124, driving assistance (driving auxiliary) for assisting driving of the compressor 123 by the turbine 121 is performed.

The valve actuation phase variable mechanism 20 is a mechanism which changes actuation phases of the intake valve and the exhaust valve of each of the cylinders 6.

The combustion chamber of each of the cylinders 6 of the engine 1 is connected to the exhaust passage 10 via an exhaust manifold 9. To the exhaust passage 10, a bypass passage 11 which bypasses the turbine 121 is connected, and to the bypass passage 11, a waste gate valve 14 which controls a flow rate of exhaust air which passes through the bypass passage 11 is provided.

Figure 2:
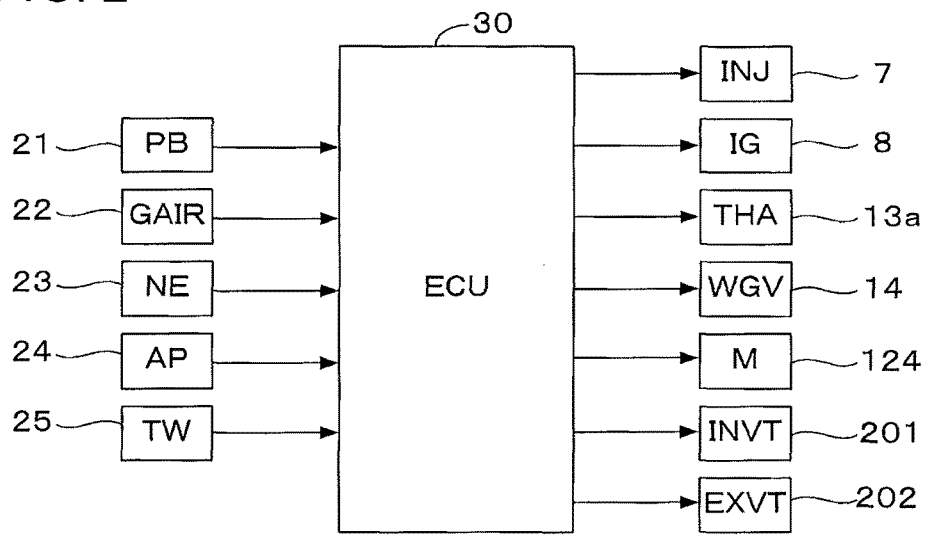
FIG. 2 is a block diagram illustrating the configuration of a control system of the internal combustion engine illustrated in FIG. 1.

FIG. 2 is a block diagram illustrating the configuration of a control system for controlling the engine 1. In addition to the intake pressure sensor 21 and the intake airflow rate sensor 22 which are described above, an engine speed sensor 23 which detects a speed NE of the engine 1, an accelerator sensor 24 which detects the depression amount (referred to below as an "accelerator pedal operation amount") AP of an accelerator pedal (not illustrated) of a vehicle which is driven by the engine 1, a cooling water temperature sensor 25 which detects an engine cooling water temperature TW, and other sensors which are not illustrated are connected to an electronic control unit (referred to below as an "ECU") 30. Detection signals of these sensors are supplied to the ECU 30.

To the output side of the ECU 30, the fuel injection valve 7, the ignition plug 8, the motor 124, the waste gate valve 14, the throttle actuator 13a, and an intake valve actuator 201 and an exhaust valve actuator 202 which are provided to the valve actuation phase variable mechanism 20 are connected. An intake valve actuation phase CAIN is changed by driving the intake valve actuator 201 and an exhaust valve actuation phase CAEX is changed by driving the exhaust valve actuator 202.

The ECU 30 includes an input circuit which has a function for shaping waveforms of input signals received from various sensors, a function for correcting a voltage level to a predetermined level, and a function for converting an analog signal value into a digital signal value, for example, a central processing unit (referred to below as a "CPU"), a storage circuit which stores various calculation programs executed in the CPU and calculation results, for example, and an output circuit which supplies a drive signal to the motor 124 and the like.

The ECU 30 performs fuel injection control by the fuel injection valve 7, ignition control by the ignition plug 8, driving assistance control with respect to the turbocharger 12 by the motor 124, turbine drive control by the waste gate valve 14, intake air rate control by the throttle valve 13, and valve actuation phase control by the intake valve actuator 201 and the exhaust valve actuator 202, in accordance with an engine operation state (mainly the engine speed NE and a required torque TRQD). The required torque TRQD is calculated mainly based on the accelerator pedal operation amount AP so that the required torque TRQD is increased as the accelerator pedal operation amount AP is increased.

Figure 3:
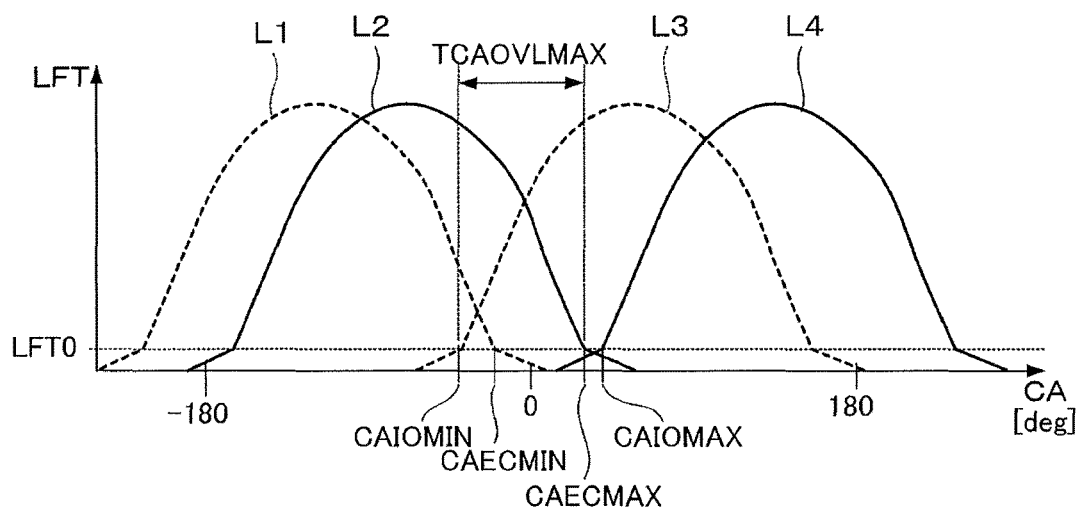
FIG. 3 shows lift curves of an intake valve and an exhaust valve for illustrating variable ranges of valve actuation phases varied by a valve actuation phase variable mechanism in FIG. 1.

FIG. 3 shows lift curves for illustrating variable ranges of valve actuation phases varied by the valve actuation phase variable mechanism 20. The horizontal axis represents a crank angle CA ("0" corresponds to the top dead center on start of an intake stroke). Dashed lines L1 and L3 respectively correspond to the most advanced actuation phase of an exhaust valve and the most advanced actuation phase of an intake valve and solid lines L2 and L4 respectively correspond to the most retarded actuation phase of the exhaust valve and the most retarded actuation phase of the intake valve. In the present embodiment, an overlap period TCAOVL in which a valve opening period of the intake valve and a valve opening period of the exhaust valve are overlapped with each other is an important control parameter. Therefore, a variable range of the overlap period TCAOVL is described by using an intake valve opening time CAIO and an exhaust valve closing time CAEC.

In the valve actuation phase variable mechanism 20 of the present embodiment, the most advanced phase CAIOMIN of the intake valve opening time CAIO is approximately ATDC (after the top dead center on start of the intake stroke) −40 degrees (that is, approximately 40 degrees before the top dead center), the most retarded phase CAIOMAX is approximately ATDC 40 degrees, the most advanced phase CAECMIN of the exhaust valve closing time CAEC is approximately ATDC −20 degrees, and the most retarded phase CAECMAX is approximately ATDC 30 degrees. Accordingly, when the overlap period TCAOVL is defined as (CAEC-CAIO), the minimum value is smaller than 0 and the maximum value TCAOVLMAX is (CAECMAX-CAIOMIN: approximately 70 degrees).

Here, FIG. 3 illustrates a valve opening/closing time on the assumption that a state in which the lift amount LFT is larger than the reference lift amount LFT0 is a valve opening state.

Figure 4:
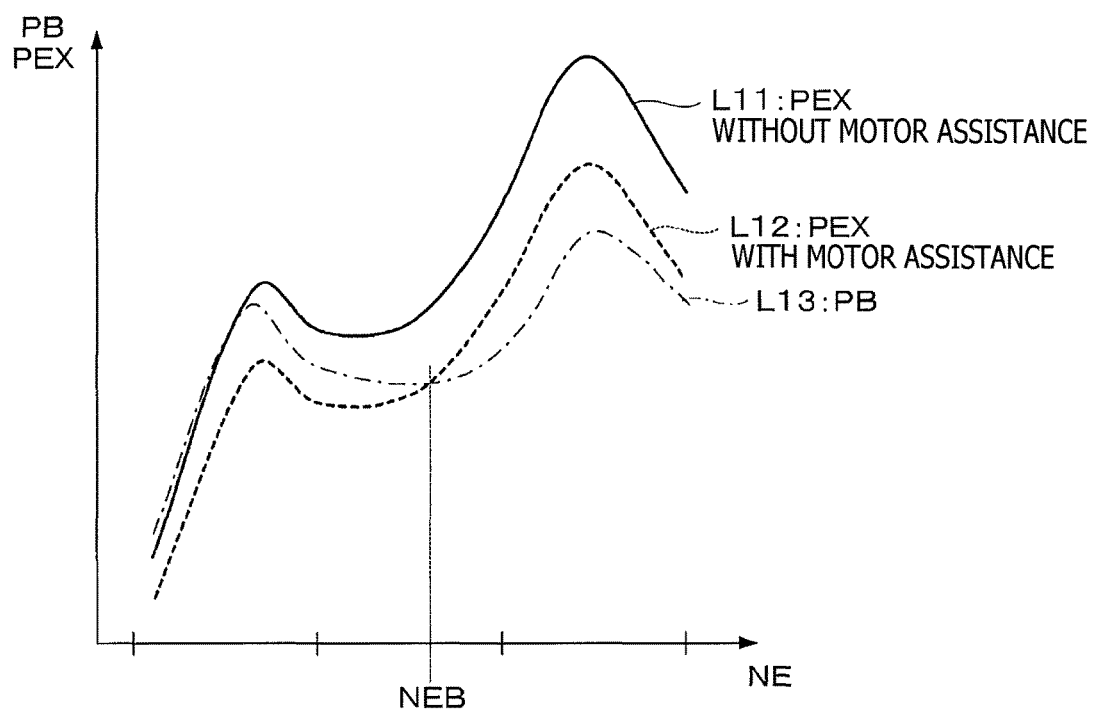
FIG. 4 illustrates a relationship between an engine speed obtained when a throttle valve is fully opened and intake pressure and a relationship between the engine speed and exhaust pressure.

FIG. 4 illustrates a relationship between the engine speed NE obtained when the throttle valve 13 is fully opened and the intake pressure PB and a relationship between the engine speed NE and the exhaust pressure PEX. A solid line L11 represents a transition of the exhaust pressure PEX obtained when driving assistance (referred to below as "motor assistance") by the motor 124 is not performed, a dashed line L12 represents a transition of the exhaust pressure PEX obtained when the motor assistance is performed, and a dashed dotted line L13 represents a transition of the intake pressure PB. As is apparent from FIG. 4, in the range in which the engine speed NE is lower than a boundary speed NEB, the exhaust pressure PEX can be lowered to be lower than the intake pressure PB by performing the motor assistance. In a state in which the exhaust pressure PEX is lower than the intake pressure PB, scavenging of residual gas in the cylinder can be promoted by increasing the overlap period TCAOVL.

Therefore, in the present embodiment, such motor assistance supercharging control is executed that the opening of the waste gate valve 14 is maximized so as to lower the exhaust pressure PEX and the overlap period TCAOVL is increased while executing the motor assistance in an operation state in which the engine speed NE is relatively low and the intake pressure PB is lower than a target supercharging pressure POBJ (referred to below as a "specific operation state"). The target supercharging pressure POBJ is a target pressure targeted when the intake pressure PB is enhanced by supercharging and the target supercharging pressure POBJ is set higher as the required torque TRQD is higher. Therefore, the specific operation state corresponds to a high-load operation state in which an accelerator pedal is rapidly depressed and the throttle valve 13 is opened to be in an approximately fully opened state when the engine speed NE is relatively low in the main.

Figure 5A:
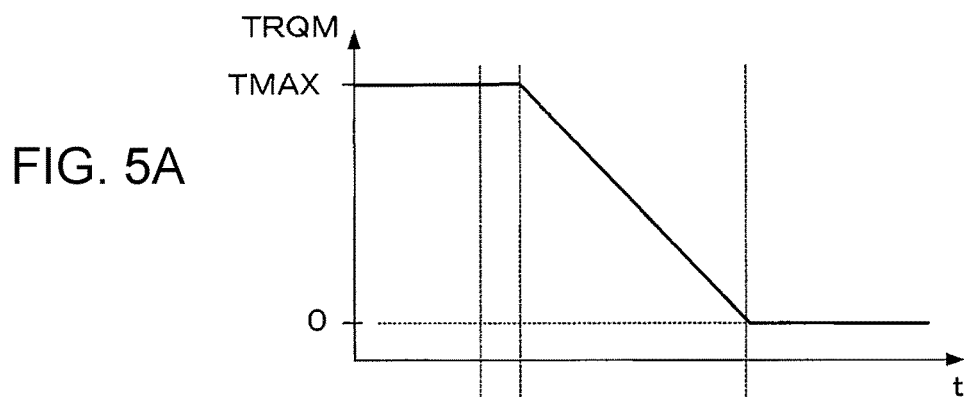
FIGS. 5A to 5D are timing diagrams for illustrating an outline of motor assistance supercharging control.
Figure 5B:
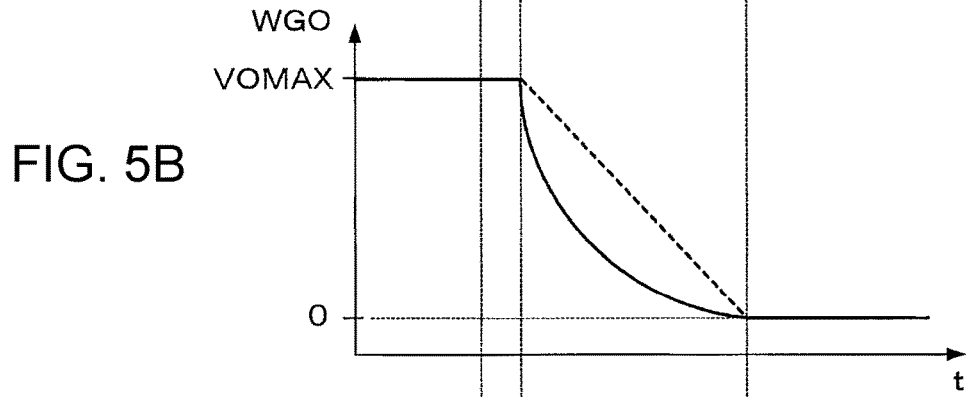
Figure 5C:
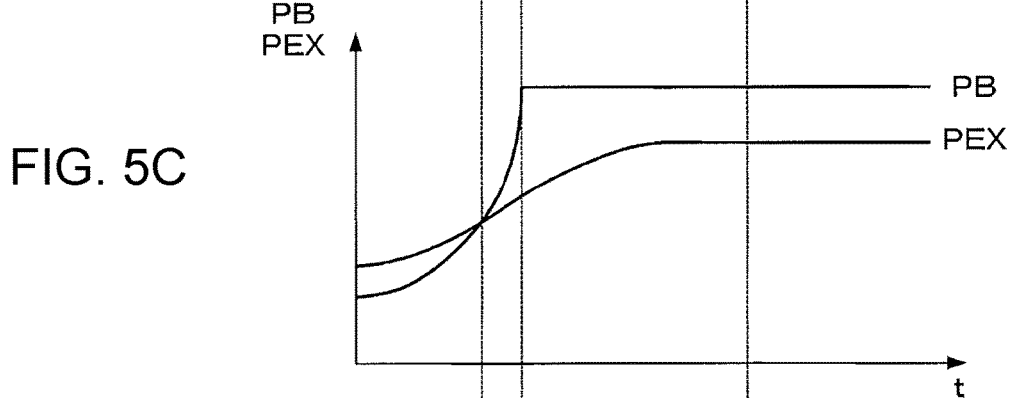

FIGS. 5A to 5D are timing diagrams for illustrating an outline of motor assistance supercharging control of the present embodiment. FIGS. 5A to 5D respectively illustrate a transition of an output torque TRQM of the motor 124, a transition of the opening of the waste gate valve 14 (referred to below as the "WG opening") WGO, transitions of the intake pressure PB and the exhaust pressure PEX, and transitions of the intake valve opening time CAIO and the exhaust valve closing time CAEC. Here, a dashed line shown in FIG. 5B represents a transition of a flow rate of exhaust air which passes through the waste gate valve 14. On the vertical axis of FIG. 5D, the intake valve opening time CAIO and the exhaust valve closing time CAEC are shown to be increased as the intake valve opening time CAIO and the exhaust valve closing time CAEC are retarded.

When the motor assistance supercharging control is started at time t0, the motor 124 is driven so that the motor output torque TRQM becomes to have the maximum value TMAX, and the waste gate valve 14 is opened so that the WG opening WGO is set to be the maximum opening VOMAX. A solid line and a dashed line in FIG. 5D respectively represents a transition of the intake valve opening time CAIO and a transition of the exhaust valve closing time CAEC. Immediately after the start of the motor assistance supercharging control, values of the intake valve opening time CAIO and the exhaust valve closing time CAEC are maintained at values immediately before the start of the motor assistance supercharging control. An example illustrated in FIG. 5D corresponds to a case where the overlap period TCAOVL at the start of the motor assistance supercharging control has a value smaller than "0".

Figure 5D:
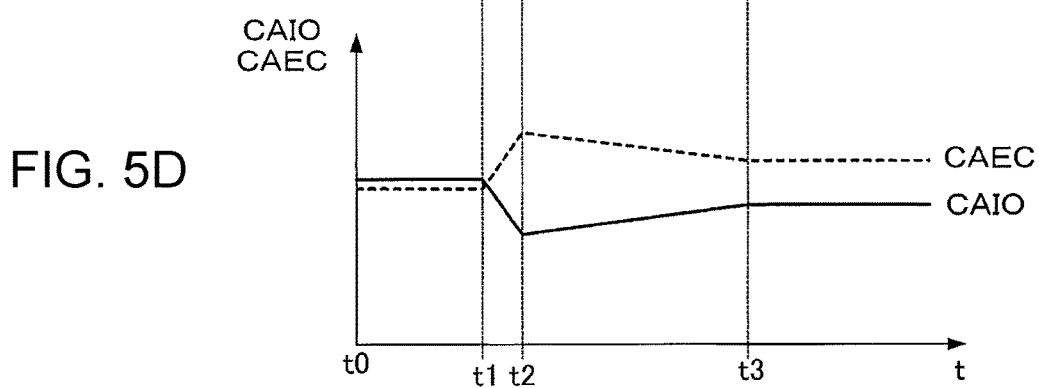

From a time point in the vicinity of time t1 at which the intake pressure PB exceeds the exhaust pressure PEX, the valve actuation phases are changed so that the intake valve opening time CAIO is advanced and the exhaust valve closing time CAEC is retarded and thus, the overlap period TCAOVL is increased. FIG. 5D illustrates such that valve actuation phases are started to be changed from time t1. However, FIG. 5D merely illustrates an ideal state and an actual change start time of valve actuation phases and time t1 are not always accorded with each other.

When the intake pressure PB reaches the target supercharging pressure POBJ at time t2, transient control for gradually lowering the motor output torque TRQM and the WG opening WGO is executed. At this time, actuation phases of the intake valve and the exhaust valve are controlled so that the intake valve opening time CAIO is gradually retarded and the exhaust valve closing time CAEC is gradually advanced. Both of the motor output torque TRQM and the WG opening WGO become "0" at time t3 and the motor assistance supercharging control shifts to normal supercharging control. Here, the change (advancing and retarding) of the intake valve opening time CAIO is actually executed through change of the intake valve actuation phase CAIN and the change of the exhaust valve closing time CAEC is actually executed through change of the exhaust valve actuation phase CAEX.

Figure 6:
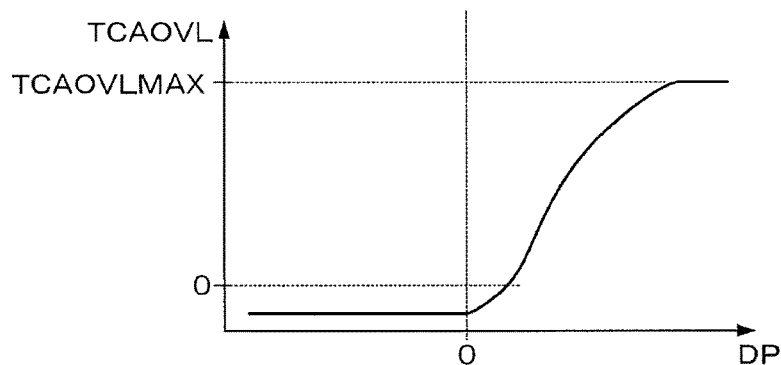
FIG. 6 illustrates a relationship between differential pressure, which is obtained by deducting the exhaust pressure from the intake pressure, and an overlap period.
Figure 7A:
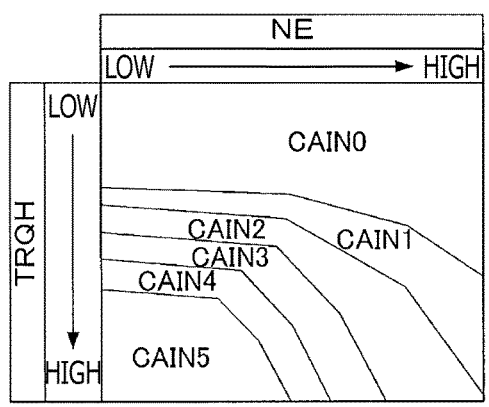
FIGS. 7A to 7D illustrate maps used for calculation of valve actuation phases of the intake valve and the exhaust valve.
Figure 7B:
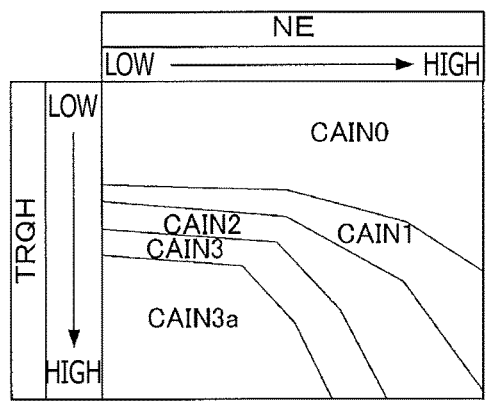
Figure 7C:
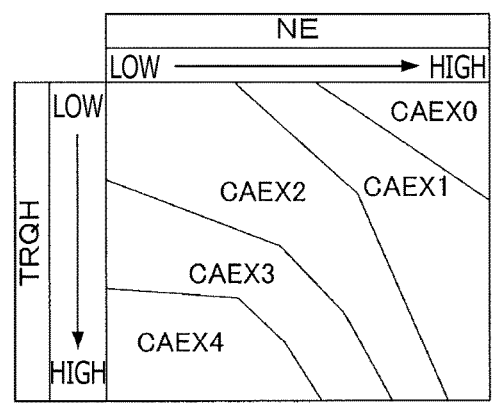
Figure 7D:
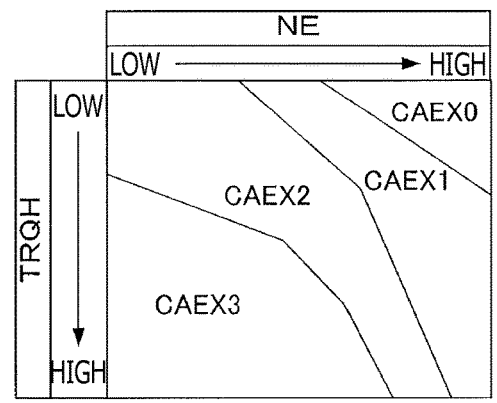

FIG. 6 illustrates an ideal relationship between differential pressure DP (=PB-PEX) obtained by deducting the exhaust pressure PEX from the intake pressure PB and the overlap period TCAOVL. In the present embodiment, the overlap period TCAOVL is set to have a value smaller than "0" in principle when the differential pressure DP has a negative value, and a calculation map of the intake valve actuation phase CAIN (referred to below as a "CAIN map") and a calculation map of the exhaust valve actuation phase CAEX (referred to below as a "CAEX map") are set so as to obtain such property that the overlap period TCAOVL is increased as the differential pressure DP is increased.

In the present embodiment, as illustrated in FIGS. 7A to 7D, the first CAIN map (FIG. 7A) and the first CAEX map (FIG. 7C) which correspond to a state in which the motor output torque TRQM reaches maximum (100%) and the second CAIN map (FIG. 7B) and the second CAEX map (FIG. 7D) which correspond to a state in which motor assistance is not performed (0%) are provided. Each of the maps is set in accordance with the engine speed NE and an estimated output torque TRQH of the engine 1. The estimated output torque TRQH is calculated based on the intake airflow rate GAIR of the engine 1 and an ignition time IG. More specifically, the estimated output torque TRQH is calculated so that the estimated output torque TRQH is increased as the intake airflow rate GAIR is increased and calculated so that the estimated output torque TRQH is decreased as the retard amount of the ignition time IG is increased when the ignition time IG is retarded from the optimum ignition time (ignition time on which an output torque reaches maximum).

Advance amounts CAIN0 to CAIN5 and CAIN0 to CAIN3$a$ based on the most retarded phase are respectively set in the first CAIN map and the second CAIN map and retard amounts CAEX0 to CAEX4 and CAEX0 to CAEX3 based on the most advanced phase are respectively set in the first CAEX map and the second CAEX map. Here, both of CAIN0 and CAEX0 correspond to the reference phase and are set to be "0". Further, when the motor output torque TRQM is between 0% and 100%, interpolation calculation is performed in accordance with the motor output torque TRQM on the corresponding time point so as to obtain the intake valve actuation phase CAIN and the exhaust valve actuation phase CAEX.

Set values of the first and second CAIN maps have the following relationship:

CAIN0<CAIN1<CAIN2<CAIN3<CAIN3$a$<CAIN4<CAIN5

That is, the set value of the first CAIN map is set to be larger than the set value of the second CAIN map and the overlap period TCAOVL is set to be increased, in a high-load region in which the estimated output torque TRQH is large.

Further, set values of the first and second CAEX maps have the following relationship:

CAEX0<CAEX1<CAEX2<CAEX3<CAEX4

That is, the set value of the first CAEX map is set to be larger than the set value of the second CAEX map and the overlap period TCAOVL is set to be increased, in the high-load region in which the estimated output torque TRQH is large.

The map setting illustrated in FIGS. 7A to 7D realizes a change characteristic of the intake valve opening time CAIO and a change characteristic of the exhaust valve closing time CAEC, which are close to the characteristics illustrated in FIG. 5D, and realizes a change characteristic of the overlap period TCAOVL which is close to the ideal characteristic illustrated in FIG. 6. Here, in FIG. 5D, the intake valve opening time CAIO and the exhaust valve closing time CAEC are maintained from time t0 to time t1 because increase of the estimated output torque TRQH is delayed with respect to increase of the target supercharging pressure POBJ accompanied by increase of the required torque TRQD.

Figure 8:
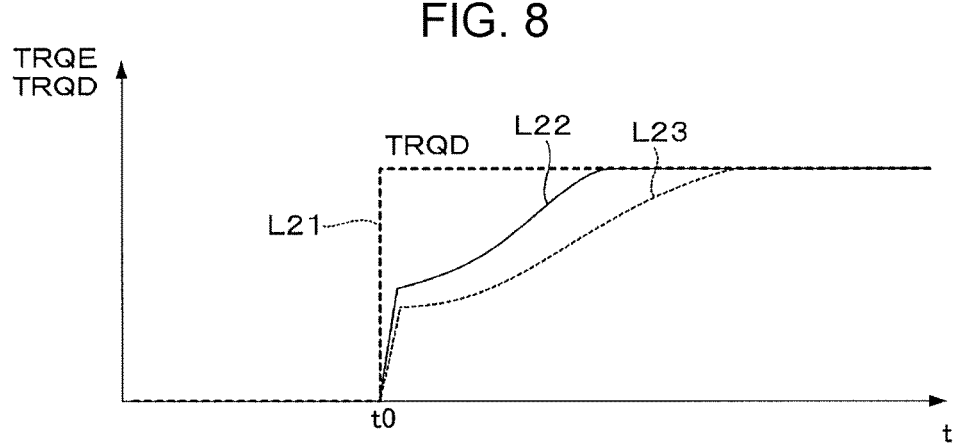
FIG. 8 illustrates a transition of an output torque obtained when engine output control corresponding to a required torque is performed.

FIG. 8 illustrates a transition of the output torque TRQE obtained when engine output control corresponding to the required torque TRQD of the engine 1 is performed. A dashed line L21 of FIG. 8 represents a transition of the required torque TRQD. A solid line L22 and a dashed line L23 represent transitions of the output torque TRQE and respectively correspond to a case where the motor assistance supercharging control is executed and a case where normal supercharging control, in which the motor assistance is not performed, is executed. As illustrated in FIG. 8, the engine output torque TRQE can be rapidly increased to the required torque TRQD by executing the motor assistance supercharging control and thus, such advantageous effect can be obtained that responsiveness of the turbocharger 12 is improved.

Figure 9A:
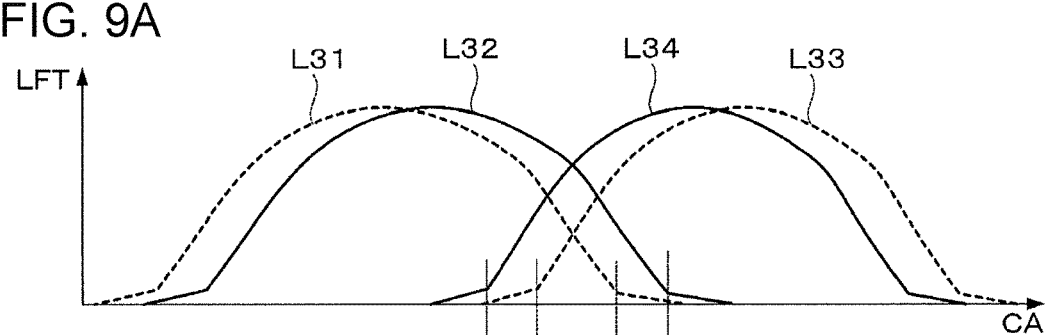
FIGS. 9A and 9B are timing diagrams for illustrating a point that a period in which the intake pressure becomes higher than the exhaust pressure and thus a scavenging effect is obtained is increased by performing motor assistance.
Figure 9B:
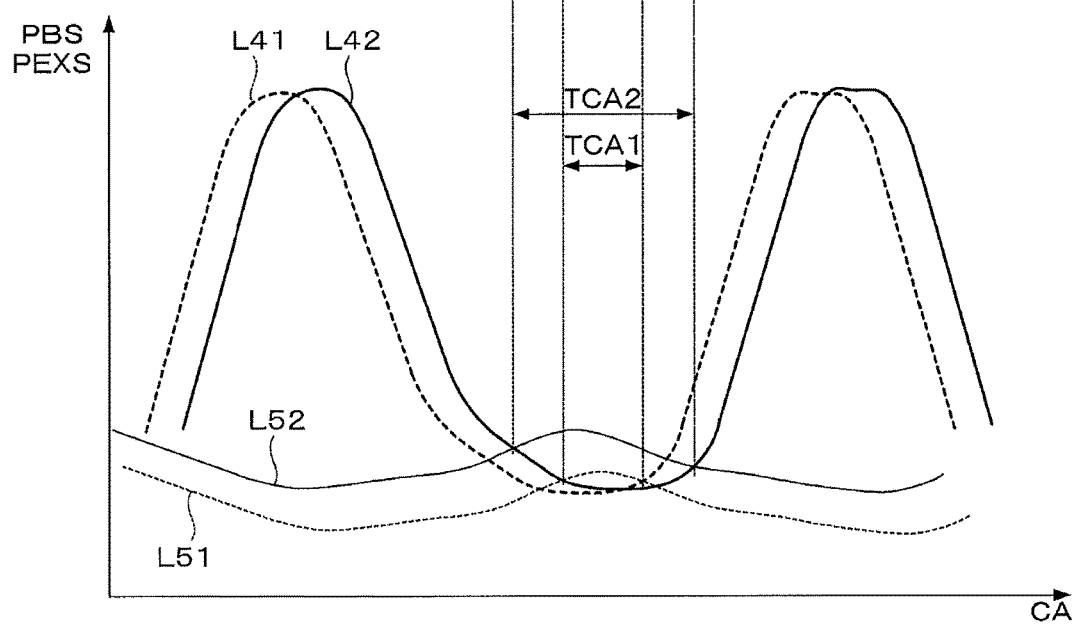

FIGS. 9A and 9B are timing diagrams for illustrating a point that a period in which intake pressure becomes higher than exhaust pressure and thus scavenging effect is obtained is increased by performing the motor assistance supercharging control (the horizontal axis represents a crank angle CA). FIG. 9A illustrates actuation phases of an intake valve and an exhaust valve and FIG. 9B illustrates transitions of intake pressure PBS and exhaust pressure PEXS. Here, the intake pressure PBS and the exhaust pressure PEXS respectively correspond to intake pressure and exhaust pressure of a single cylinder.

Dashed lines L31, L33, L41, and L51 correspond to a case where the motor assistance supercharging control is not performed and solid lines L32, L34, L42, and L52 correspond to a case where the motor assistance supercharging control is performed.

In the case where the motor assistance supercharging control is not performed, a high intake pressure period in which the intake pressure PBS is higher than the exhaust pressure PEXS is TCA1 and the overlap period TCAOVL in which the scavenging effect is obtained is limited to the high intake pressure period TCA1 or shorter. On the other hand, in the case where the motor assistance supercharging control is performed, the intake pressure PBS rises from a pressure value represented by the dashed line L51 to a pressure value represented by the solid line L52 and therefore, the high intake pressure period is TCA2. Accordingly, the overlap period TCAOVL in which the scavenging effect is obtained can be increased to the high intake pressure period TCA2. Here, the transition of the exhaust pressure PEXS is changed from the dashed line L41 to the solid line L42 because the exhaust valve actuation phase is retarded so as to increase the overlap period TCAOVL.

Figure 10:
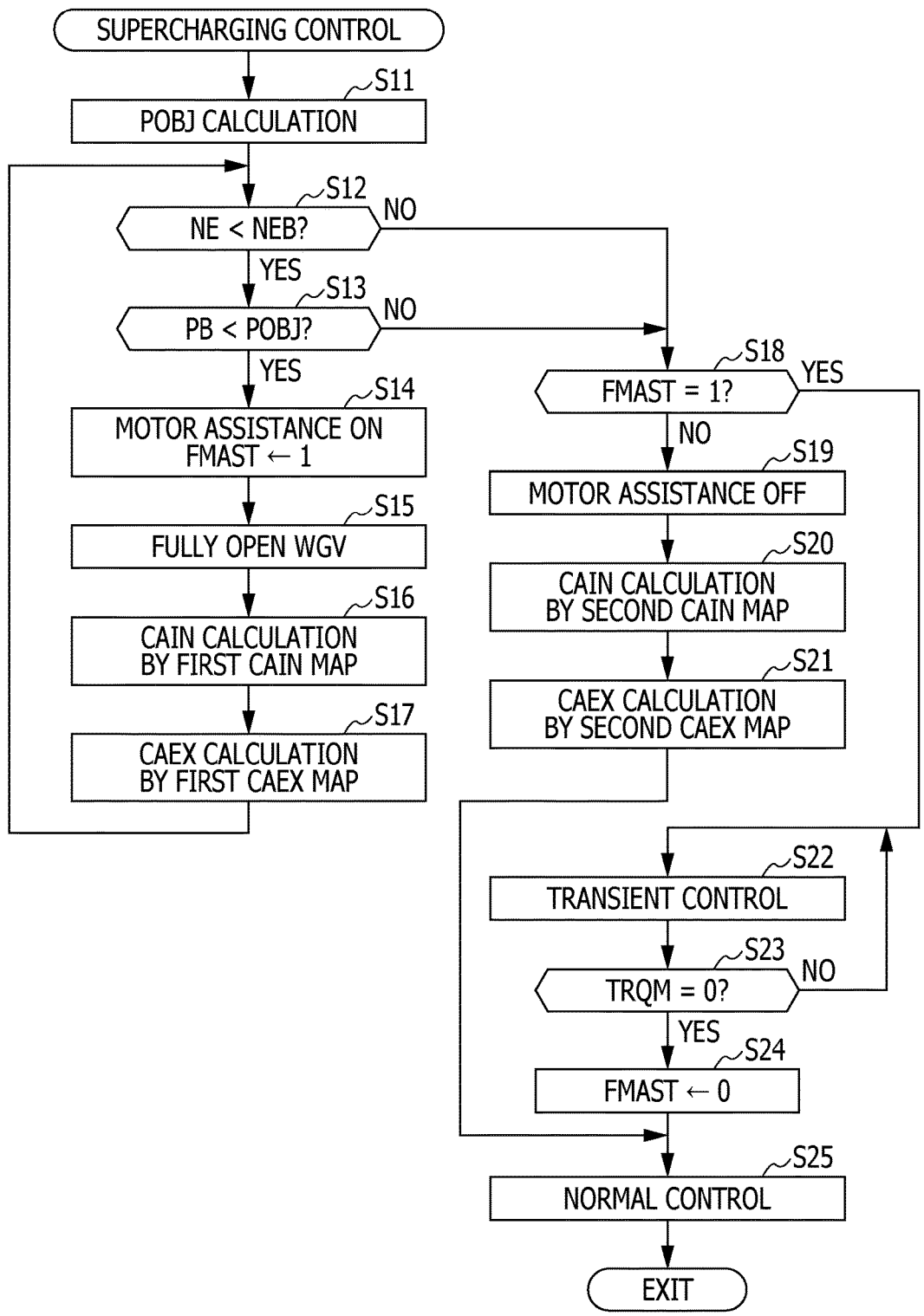
FIG. 10 is a flowchart for illustrating the motor assistance supercharging control processing.

FIG. 10 is a flowchart for illustrating the above-described motor assistance supercharging control. In step S11, the target supercharging pressure POBJ is calculated in accordance with the required torque TRQD and the engine speed NE. In step S12, whether or not the engine speed NE is lower than the boundary speed NEB (which is set to be approximately 3000 rpm, for example) is determined. When the answer of step S12 is affirmative (YES), whether or not the intake pressure PB is lower than the target supercharging pressure POBJ is determined (step S13). The boundary speed NEB is set so that a low speed state of the engine 1, in which the exhaust pressure PEX can be lowered to be lower than the intake pressure PB, can be determined by executing motor assistance (see FIG. 4).

When the answer of step S12 or S13 is negative (NO) and the engine speed NE is equal to or higher than the boundary speed NEB or the intake pressure PB is equal to or higher than the target supercharging pressure POBJ, whether or not a motor assistance ON flag FMAST is "1" is determined (step S18). The motor assistance ON flag FMAST is a flag which is set to "1" when the motor assistance is started (see step S14). When the answer of step S18 is negative (NO), the motor assistance is turned off (step S19), the intake valve actuation phase CAIN is calculated by using the second CAIN map (step S20), and the exhaust valve actuation phase CAEX is calculated by using the second CAEX map (step S21). Then, normal supercharging control is executed (step S25). When the answer of step S18 is affirmative (YES) and the answer of step S12 or S13 becomes negative (NO) after execution of step S14, the process goes to step S22 and the transient control which is described with reference to FIGS. 5A to 5D is executed.

When the answer of step S13 is affirmative (YES), the motor assistance supercharging control is executed. In step S14, the motor assistance is turned on and the motor assistance ON flag FMAST is set to "1". At this time, the motor 124 is driven so that the output torque TRQM has the maximum value TMAX. In step S15, the waste gate valve 14 is fully opened. That is, the waste gate valve 14 is opened to be in a fully-opened state when the waste gate valve 14 is closed, while, when the waste gate valve 14 is already in the fully-opened state, the state is maintained.

The intake valve actuation phase CAIN is calculated by using the first CAIN map (step S16) in step S16 and the exhaust valve actuation phase CAEX is calculated by using the first CAEX map (step S17). As described with reference to FIGS. 7A to 7D, the set value of the first CAIN map is larger than the set value of the second CAIN map and the set value of the first CAEX map is larger than the set value of the second CAEX map, in the high-load region in which the estimated output torque TRQH is large. Accordingly, the overlap period TCAOVL is increased by applying the intake valve actuation phase CAIN and the exhaust valve actuation phase CAEX which are respectively calculated in step S16 and step S17. After the execution of step S17, the process returns to step S12.

When the answer of step S12 or S13 becomes negative (NO) during the execution of the motor assistance supercharging control by steps S12 to S17, the process goes to step S22 through step S18 and the transient control which is described with reference to FIGS. 5A to 5D is executed. That is, the motor output torque TRQM and the WG opening WGO are gradually reduced. Further, the intake valve actuation phase CAIN is calculated by performing interpolation calculation of the set value of the first CAIN map and the set value of the second CAIN map so as to be gradually retarded, while the exhaust valve actuation phase CAEX is calculated by performing interpolation calculation of the set value of the first CAEX map and the set value of the second CAEX map so as to be gradually advanced.

In step S23, whether or not the motor output torque TRQM is "0" is determined. When the answer in step S23 is negative (NO), the transient control is continued. When the answer in step S23 is affirmative (YES), the motor assistance ON flag FMAST is set to "0" (step S24) and the motor assistance supercharging control is shifted to normal control.

In the present embodiment, when the motor assistance supercharging control in which driving assistance with respect to the compressor 123 is performed by the motor 124 is executed, such control is performed that the opening WGO of the waste gate valve 14 is increased and the overlap period TCAOVL in which the valve opening period of the intake valve and the valve opening period of the exhaust valve are overlapped with each other is increased, as described above. By increasing the opening WGO of the waste gate valve 14, such setting can be achieved that increase of the exhaust pressure PEX is minimized when the required load TRQD is high, that is, when the target supercharging pressure POBJ is high, so as to enhance the filling efficiency and the ignition time is made closer to the optimum ignition time. Further, by increasing the overlap period TCAOVL, scavenging of residual gas in the combustion chamber can be promoted to increase the fresh air amount and the ignition time can be advanced while avoiding knocking. As a result, engine output can be enhanced to be able to improve fuel economy. More specifically, execution of the motor assistance supercharging control in the specific operation state (NE<NEB, PB<POBJ) of the engine 1 can provide an effect of enhancing an engine output due to a remarkable scavenging promoting effect and an effect of improving responsiveness of the turbocharger 12.

Further, when the intake pressure PBA reaches the target supercharging pressure POBJ after the start of the motor assistance, such transient control is performed that the motor output torque TRQM is reduced and the opening WGO of the waste gate valve is reduced. After sufficient supercharging pressure (target supercharging pressure) is obtained, the motor output torque TRQM is reduced to shift the supercharging to normal supercharging using exhaust energy, being able to reduce power for driving the motor 124.

It should be noted that the present disclosure is not limited to the above-described embodiment but various alterations can be made. For example, the specific operation state in which the motor assistance supercharging control is executed is set to be the state in which the engine speed NE is lower than the boundary speed NEB and the intake pressure PB is lower than the target supercharging pressure POBJ, in the control illustrated in FIG. 10. However, the motor assistance supercharging control may be executed more simply such that time from a time point on which the accelerator pedal operation amount AP is rapidly increased from a relatively small value to a time point after elapse of predetermined time TMASTX is determined as the specific operation state. The predetermined time TMASTX is set to be from a time point on which the throttle valve opening is shifted from a state close to a fully-closing state to a throttle valve fully-opening operation (a time point on start of the motor assistance supercharging control) to a time point at which the intake pressure PB securely reaches the target supercharging pressure POBJ, for example. By setting the predetermined time TMASTX so that sufficient supercharging pressure can be obtained, excessive assistance by the motor 124 can be avoided and power consumption can be reduced.

Further, in the example illustrated in FIG. 5D, such operation example is illustrated that the overlap period TCAOVL at a time point on start of the motor assistance supercharging control has a value smaller than "0" and the overlap period TCAOVL is increased from the state. However, there is a case where an initial value of the overlap period TCAOVL at a time point on start of the motor assistance supercharging control is larger than "0". In that case, such control is performed that the overlap period TCAOVL is increased during execution of the motor assistance supercharging control from the initial value.

Further, in the above-described motor assistance supercharging control, the motor output torque TRQM and the WG opening WGO are set to have maximum values from the start point of the control, but the motor output torque TRQM and the WG opening WGO are not necessarily set to have the maximum values and may be set to have values slightly smaller than the maximum values. Further, in the above-described embodiment, the valve actuation phase variable mechanism 20 which is capable of changing actuation phases of the intake valve and the exhaust valve is used. However, the overlap period TCAOVL can be changed by changing either one of the actuation phases of the intake valve and the exhaust valve, so that a mechanism which is capable of changing either one of the actuation phases of the intake valve and the exhaust valve may be used as the valve actuation phase variable mechanism 20. Further, FIG. 1 illustrates the engine having four cylinders, but the present disclosure is applicable irrespective of the number of cylinders.

A control device for internal combustion engine, according to a first aspect of the present disclosure, in which fuel is directly injected into a combustion chamber, includes a supercharger which includes a turbine, which is provided on an exhaust passage of the engine, a compressor, which is rotationally driven by the turbine and pressurizes intake air of the engine, and an electric motor, which is provided to be able to drive the compressor; a valve actuation phase variable mechanism which is capable of changing an actuation phase of at least one of an intake valve and an exhaust valve of the engine; and a waste gate valve which is provided on a bypass passage bypassing the turbine, in which when driving auxiliary by the electric motor is performed with respect to the compressor, opening (WGO) of the waste gate valve is increased and an overlap period (TCAOVL) in which a valve opening period of the intake valve and a valve opening period of the exhaust valve are overlapped with each other is increased.

Here, it should be noted that "the overlap period is increased" includes a case where the overlap period at a time point on start of the driving auxiliary with respect to the compressor by the electric motor is increased from a value larger than "0" and a case where the overlap period is increased from a value equal to or smaller than "0".

According to this configuration, when the driving auxiliary by the electric motor is performed with respect to the compressor, such control is performed that the opening of the waste gate valve is increased and the overlap period in which the valve opening period of the intake valve and the valve opening period of the exhaust valve are overlapped with each other is increased. By increasing the opening of the waste gate valve, such setting can be achieved that increase of the exhaust pressure is minimized when a required load of the engine is high so as to enhance the filling efficiency and the ignition time is made closer to the optimum ignition time. Further, by increasing the overlap period, scavenging of residual gas in the combustion chamber can be promoted to increase the fresh air amount and the ignition time can be advanced while avoiding knocking. As a result, an output of the engine can be enhanced to improve fuel economy and improve responsiveness of the supercharger.

According to a second aspect of the present disclosure, the driving auxiliary by the electric motor may be executed in an operation state in which a speed of the engine is relatively low and intake pressure of the engine is lower than a target supercharging pressure (POBJ) in the control device for internal combustion engine according to the first aspect.

By performing the driving auxiliary by the electric motor in the operation state in which the engine speed is relatively low and the intake pressure is lower than the target supercharging pressure, rise of the intake pressure is accelerated to be able to obtain an effect in improving responsiveness of the supercharger and an effect in promoting scavenging.

According to a third aspect of the present disclosure, when the intake pressure (PB) of the engine reaches the target supercharging pressure (POBJ) after start of the driving auxiliary by the electric motor, an output of the electric motor may be lowered and the opening (WGO) of the waste gate valve may be reduced, in the control device for internal combustion engine according to the first or second aspect.

According to this configuration, when the intake pressure reaches predetermined pressure after the start of the driving auxiliary by the electric motor, such control is performed that the output of the electric motor is reduced and the opening of the waste gate valve is reduced. After sufficient supercharging pressure (target supercharging pressure) is obtained, the driving auxiliary by the electric motor is reduced to shift the supercharging to normal supercharging using exhaust energy, being able to reduce power for driving the electric motor.

According to a fourth aspect of the present disclosure, when predetermined time (TMASTX) elapses from a time point on the start of the driving auxiliary by the electric motor, the output of the electric motor may be lowered and the opening (WGO) of the waste gate valve may be reduced, in the control device for internal combustion engine according to the first or second aspect.

According to this configuration, when predetermined time elapses from a time point on the start of the driving auxiliary by the electric motor, such control is performed that the output of the electric motor is lowered and the opening of the waste gate valve is reduced. The predetermined time is set to time at which the intake pressure securely reaches the target supercharging pressure so as to be able to obtain the advantageous effect same as that of the third aspect.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine in which fuel is directly injected into a combustion chamber, the control device comprising:
   a supercharger which includes a turbine, the turbine being provided on an exhaust passage of the engine, a compressor, the compressor being rotationally driven by the turbine and pressurizing intake air of the engine, and an electric motor, the electric motor being provided to be able to drive the compressor;
   a valve actuation phase variable mechanism which is capable of changing an actuation phase of at least one of an intake valve and an exhaust valve of the engine;
   a waste gate valve which is provided on a bypass passage bypassing the turbine; and
   an electronic control unit configured to control the electric motor, the valve actuation phase variable mechanism, and an opening of the waste gate valve such that when the electric motor drives the compressor in an auxiliary driving state, the opening of the waste gate valve is increased while an intake pressure of the engine is determined to be lower than a target supercharging pressure, and an overlap period in which a valve opening period of the intake valve and a valve opening period of the exhaust valve are overlapped with each other is increased.

2. The control device according to claim 1, wherein the electronic control unit is configured to cause the auxiliary driving state to be executed in an operation state in which a speed of the engine is determined to be lower than a predetermined threshold speed.

3. The control device according to claim 1, wherein the electronic control unit is configured to control the electric motor and the opening of the waste gate valve such that when the electronic control unit determines that the intake pressure of the engine reaches the target supercharging pressure after a start of the auxiliary driving state, an output of the electric motor is lowered and the opening of the waste gate valve is reduced.

4. The control device according to claim 1, wherein the electronic control unit is configured to control the electric motor and the opening of the waste gate valve such that when predetermined time elapses from a time point at the start of the auxiliary driving state, an output of the electric motor is lowered and the opening of the waste gate valve is reduced.

5. The control device according to claim 1, wherein the electronic control unit is configured to increase the overlap period in which the valve opening period of the intake valve and the valve opening period of the exhaust valve are overlapped with each other based on a determination that the intake pressure of the engine is determined to be lower than the target supercharging pressure.

6. A control device for an internal combustion engine including a combustion chamber into which fuel is directly injected, a supercharger including a turbine provided in an exhaust passage of the internal combustion engine, a waste gate valve provided in a bypass passage bypassing the turbine, a compressor rotationally driven by the turbine and an electric motor to pressurize intake air, and a valve actuation phase variable mechanism configured to change an actuation phase of at least one of an intake valve and an exhaust valve of the internal combustion engine, the control device comprising:
circuitry configured to
determine whether a running state of the internal combustion engine is in an auxiliary driving state in which the electric motor drives the compressor;
increase an opening degree of the waste gate valve when the running state is determined to be in the auxiliary driving state and an intake pressure of the internal combustion engine is determined to be lower than a target supercharging pressure; and
control the valve actuation phase variable mechanism to increase an overlap period in which a valve opening period of the intake valve and a valve opening period of the exhaust valve are overlapped with each other when the running state is determined to be in the auxiliary driving state.

7. The control device according to claim 6, wherein the circuitry is configured to cause the auxiliary driving state to be executed in an operation state in which a speed of the internal combustion engine is lower than a predetermined threshold speed.

8. The control device according to claim 6, wherein the circuitry is configured to control the electric motor and the opening of the waste gate valve such that when the circuitry determines that the intake pressure of the internal combustion engine reaches the target supercharging pressure after a start of the auxiliary driving state, an output of the electric motor is lowered and the opening of the waste gate valve is reduced.

9. The control device according to claim 6, wherein the circuitry is configured to control the electric motor and the opening of the waste gate valve such that when a predetermined time elapses from a time point at the start of the auxiliary driving state, an output of the electric motor is lowered and the opening of the waste gate valve is reduced.

10. The control device according to claim 6, wherein the circuitry is configured to increase the overlap period in which the valve opening period of the intake valve and the valve opening period of the exhaust valve are overlapped with each other based on a determination that the intake pressure of the internal combustion engine is determined to be lower than the target supercharging pressure.

11. An internal combustion engine system comprising:
an internal combustion engine comprising:
a combustion chamber into which fuel is directly to be injected;
a supercharger comprising:
a turbine provided on an exhaust passage of the internal combustion engine;
a compressor to be rotationally driven by the turbine and to pressurize intake air of the internal combustion engine; and
an electric motor to drive the compressor;
a valve actuation phase variable mechanism to change an actuation phase of at least one of an intake valve and an exhaust valve of the internal combustion engine; and
a waste gate valve provided on a bypass passage bypassing the turbine; and circuitry configured to
determine whether a running state of the internal combustion engine is in an auxiliary driving state in which the electric motor drives the compressor;
increase an opening degree of the waste gate valve when the running state is determined to be in the auxiliary driving state and an intake pressure of the internal combustion engine is determined to be lower than a target supercharging pressure; and
control the valve actuation phase variable mechanism to increase an overlap period in which a valve opening period of the intake valve and a valve opening period of the exhaust valve are overlapped with each other when the running state is determined to be in the auxiliary driving state.

12. The internal combustion engine system according to claim 11, wherein the circuitry is configured to increase the overlap period in which the valve opening period of the intake valve and the valve opening period of the exhaust valve are overlapped with each other based on a determination that the intake pressure of the internal combustion engine is determined to be lower than the target supercharging pressure.

13. A method for controlling an internal combustion engine including a combustion chamber into which fuel is directly injected, a supercharger including a turbine provided in an exhaust passage of the internal combustion engine, a waste gate valve provided in a bypass passage bypassing the turbine, a compressor rotationally driven by the turbine and an electric motor to pressurize intake air, and a valve actuation phase variable mechanism configured to change an actuation phase of at least one of an intake valve and an exhaust valve of the internal combustion engine, the method comprising:
determining whether a running state of the internal combustion engine is in an auxiliary driving state in which the electric motor drives the compressor;
increasing an opening degree of the waste gate valve when the running state is determined to be in the auxiliary driving state and an intake pressure of the internal combustion engine is determined to be lower than a target supercharging pressure; and
controlling the valve actuation phase variable mechanism to increase an overlap period in which a valve opening period of the intake valve and a valve opening period of the exhaust valve are overlapped with each other when the running state is determined to be in the auxiliary driving state.

14. The method according to claim 13, wherein the increasing the overlap period in which the valve opening period of the intake valve and the valve opening period of the exhaust valve are overlapped with each other is performed based on a determination that the intake pressure of the internal combustion engine is determined to be lower than the target supercharging pressure.

* * * * *